US009766910B1

(12) United States Patent
Berg et al.

(10) Patent No.: US 9,766,910 B1
(45) Date of Patent: Sep. 19, 2017

(54) PROVIDING FIELD-PROGRAMMABLE DEVICES IN A DISTRIBUTED EXECUTION ENVIRONMENT

(71) Applicant: Amazon Technologies, Inc., Seattle, WA (US)

(72) Inventors: Paul William Berg, Seattle, WA (US); Eden Grail Adogla, Seattle, WA (US); Marc John Brooker, Seattle, WA (US); John Clark Coonley Duksta, Seattle, WA (US); Robert James Hanson, Seattle, WA (US); Jamie Hunter, Kirkland, WA (US)

(73) Assignee: Amazon Technologies, Inc., Reno, NV (US)

( * ) Notice: Subject to any disclaimer, the term of this patent is extended or adjusted under 35 U.S.C. 154(b) by 240 days.

(21) Appl. No.: 13/788,357

(22) Filed: Mar. 7, 2013

(51) Int. Cl.
*G06F 9/455* (2006.01)

(52) U.S. Cl.
CPC .................................. *G06F 9/455* (2013.01)

(58) Field of Classification Search
None
See application file for complete search history.

(56) References Cited

U.S. PATENT DOCUMENTS

| | | | |
|---|---|---|---|
| 8,745,561 B1* | 6/2014 | Garg et al. .................... 716/113 |
| 2005/0093571 A1* | 5/2005 | Suaris et al. .................... 326/37 |
| 2005/0257186 A1* | 11/2005 | Zilbershlag ..................... 716/18 |
| 2006/0150188 A1* | 7/2006 | Roman ................ G06F 9/4887 |
| | | | 718/104 |
| 2007/0198240 A1* | 8/2007 | Moriat ............... G06F 17/5027 |
| | | | 703/17 |
| 2010/0325381 A1* | 12/2010 | Heim ............................ 711/170 |
| 2013/0036409 A1* | 2/2013 | Auerbach et al. ............ 717/140 |
| 2013/0145431 A1* | 6/2013 | Kruglick ............... G06F 21/629 |
| | | | 726/4 |
| 2014/0215424 A1* | 7/2014 | Fine et al. .................... 716/117 |
| 2015/0169376 A1* | 6/2015 | Chang ...................... G06F 9/48 |
| | | | 718/104 |

\* cited by examiner

*Primary Examiner* — Sisley Kim
(74) *Attorney, Agent, or Firm* — Kilpatrick Townsend & Stockton LLP

(57) ABSTRACT

A distributed execution environment can provide access to field-programmable device resources. The field-programmable device resources can be provided in association with one or more instances that are instantiated within the distributed execution environment upon request from a computing system. The computing system can be associated with a customer of the distributed execution environment. The customer can program the field-programmable device resources using designs created by or for the customer.

23 Claims, 10 Drawing Sheets

PROVIDING FIELD-PROGRAMMABLE DEVICES IN A DISTRIBUTED EXECUTION ENVIRONMENT

BACKGROUND

Field-programmable devices, such as field-programmable gate arrays ("FPGAs"), are devices that can be programmed after manufacturing to provide functionality via hardware. FPGAs are used in a variety of general applications, including digital signal processing ("DSP"), embedded processing, and hardware prototyping. FPGAs are used in a variety of industries, as well as in hobbyist markets and in education.

FPGAs are commonly offered in a variety of low, mid, and high-range configurations to accommodate users with different needs, skill sets, and financial resources. For example, low or mid-range FPGAs are sometimes used in University classrooms as a platform for teaching hardware prototyping. Due to cost-cutting measures or other priorities, the FPGAs made available to students may be outdated, in poor functional order, or may otherwise be unsuitable for use in certain projects. Similarly, the hobbyist that is interested in learning more about hardware prototyping or the entrepreneur that is interested in designing a chip for his or her new gadget may be without the resources necessary to purchase an FPGA suitable for their use case.

It is respect to these and other considerations that the disclosure made herein is presented.

DETAILED DESCRIPTION

The following detailed description is directed to providing field-programmable devices in a distributed execution environment. A distributed execution environment can provide access to field-programmable device resources. The field-programmable device resources can be provided in association with one or more instances that are instantiated within the distributed execution environment upon request from a computing system. The computing system can be associated with a customer of the distributed execution environment. The customer can program the field-programmable device resources using field-programmable device designs created by or for the customer.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, hand-held computers, personal digital assistants, e-readers, cellular telephone devices, special-purposed hardware devices, network appliances, and the like. The embodiments described herein may be practiced in distributed execution environments, where tasks are performed by remote processing devices that are linked through a communications network. In a distributed execution environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Figure 1:
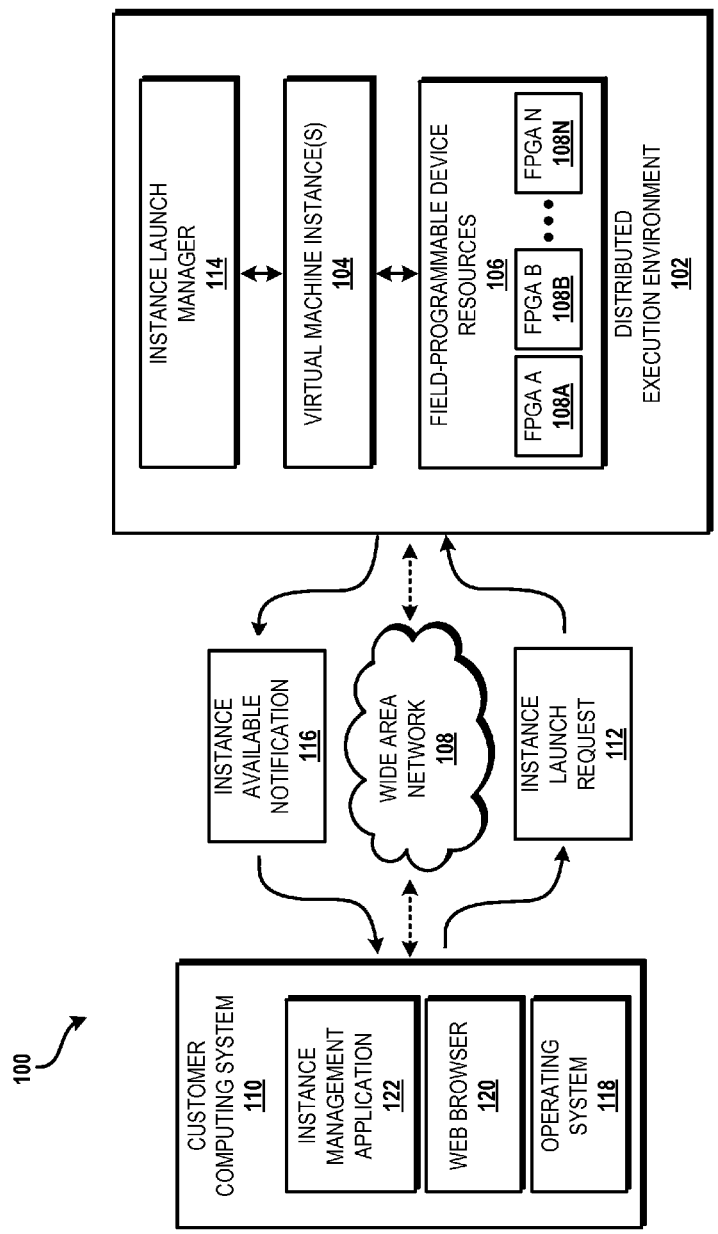
FIG. 1 is a computer system diagram providing an overview description of a mechanism disclosed herein for providing field-programmable devices in a distributed execution environment, according to one embodiment presented herein.

FIG. 1 is a computer system diagram 100 providing an overview description of a mechanism disclosed herein for providing field-programmable devices in a distributed execution environment 102, according to one embodiment presented herein. The distributed execution environment 102 allows customers to purchase and utilize instances of computing resources, such as one or more virtual machine instances 104 (which may be referred herein singularly as "the virtual machine instance 104" or in the plural as "the virtual machine instances 104"), on a permanent or as-needed basis. The distributed execution environment 102 may offer instances of computing resources for purchase in various configurations. For example, the distributed execution environment 102 might offer the virtual machine instances 104 for purchase and use in many different configurations of processor capabilities, main memory, disk storage, operating system, other hardware, and other software. The distributed execution environment 102 might also offer instances of other types of resources, such as field-programmable device resources 106, for purchase and use by customers.

The field-programmable device resources 106 can include one or more field-programmable devices and/or one or more virtualized field-programmable devices. As used herein, a "field-programmable device" is a device that can be programmed after manufacturing to provide functionality via hardware. A "virtualized field-programmable device" is a virtualization of one or more devices that can be programmed after manufacturing to providing functionality via hardware. In some embodiments, a virtual field-programmable device is implemented as a portion of a physical field-programmable device, such that a single physical device might have host two or more virtualized devices. In some other embodiments, a virtual field-programmable device is implemented as a plurality of physical field-programmable devices.

In the illustrated embodiment, the field-programmable device resources 106 include FPGAs 108A-108N (which may be referred herein singularly as "the FPGA 108" or in the plural as "the FPGAs 108"). Each of the FPGAs 108 can be an off-the-shelf FPGA or a proprietary FPGA. Moreover, the FPGAs 108 may offer different functionality to support a wide array of potential projects that a customer may desire to pursue. In some embodiments, at least some of the virtual machine instances 104 are offered with some configurations that include access to one or more of the FPGAs 108, which might be in addition to other resources, such as CPU, memory, and/or storage.

An FPGA is a semiconductor device that can be programmed after manufacturing. FPGAs are not restricted to predetermined hardware functions. A user can program an FPGA using a hardware description language ("HDL"), such as Verilog or very-high speed integrated circuits ("VHSIC") HDL ("VHDL"), to perform functions, provide product features, adapt to new standards, and reconfigure the FPGA for new applications even after the FPGA has been previously deployed for another application. An FPGA can be utilized to implement any logical function that an application-specific integrated circuit ("ASIC") could perform. An FPGA can be reprogrammed multiple times.

An FPGA can include configurable embedded static random access memory ("SRAM"), transceivers, I/O components, logic blocks, and routing components. More specifically, an FPGA can include programmable logic components called logic elements ("LEs") and a hierarchy of reconfigurable interconnects that allow the LEs to be physically connected. LEs can be configured to perform complex combinational functions, or merely simple logic gates, such as AND and XOR. In some FPGAs, the logic blocks also include memory elements, which may be simple flip-flops or more complex blocks of memory.

In some embodiments, an FPGA can be connected to or otherwise in communication with an external memory component, such as RAM, ROM, or both, so as to enable the FPGA to be bootstrapped from the external memory component. In some embodiments, an FPGA is bootstrapped using Joint Test Action Group ("JTAG") (also known as IEEE 1149.1). In some embodiments, an FPGA includes additional circuitry to provide input stimulus and output capture. The additional circuitry might be implemented in modules and/or pin connections such as, but not limited to, a standard serial connection. A host machine, such as one of the virtual machine instances 104, may poll and read and/or write data to and/or from a device connected through the additional circuitry. In some embodiments, an FPGA can be connected to or otherwise in communication with one or more peripheral devices, which may or may not be dedicated to the FPGA. A peripheral device might be a dual-port RAM device that allows a host machine, such as one of the virtual machine instances 104, to access RAM to read and write data to the RAM and to erase the data contained within the RAM between each usage cycle. It should be understood that these embodiments are illustrative, and should not be construed as being limiting in any way.

In some embodiments, at least some of the virtual machine instances 104 are offered with resources that are equivalent to a specified number of FPGAs, which may be physical FPGAs, virtualized FPGAs, or a combination of both. In these embodiments, a "large" FPGA, for example, may be virtualized as four "small" virtual FPGAs such that a request to instantiate a fleet of four "small" FPGAs could be met by instantiating one physical "large" FPGA that is divided into four virtual "small" FPGAs. The "small," "medium," and "large" examples may be offered as an easy-to-understand guide by which the field-programmable device resources 106 are presented to the customer, so that the customer can request an FPGA based upon their needs in terms of field-programmable device resources rather than the specifications of the actual physical FPGA that they want to utilize. A virtualized FPGA alternatively may be comprised of a plurality of physical FPGAs. For example, a "large" FPGA may be a virtual FPGA that includes a plurality of smaller FPGAs to provide the resources associated with the "large" designation. It should be understood that these embodiments are illustrative, and should not be construed as being limiting in any way.

The field-programmable device resources 106 can additionally or alternatively include other field-programmable devices such as field-programmable object arrays ("FPOAs"), memristor arrays, programmable neural network devices, and the like. It is contemplated that the field-programmable device resources 106 may be offered in various combinations of FPGAs, FPOAs, memristor arrays, programmable neural network devices, and/or other field-programmable devices based upon customer need.

FPOAs fill a gap between FPGAs and application-specific integrated circuits ("ASICs"). A typical FPOA includes a number of programmable objects along with a programmable high-speed interconnection network. The objects in an FPOA, as compared to the relatively simple gates of an FPGA, can be more complex (sometimes considerably more complex), while the number of objects in a typical FPOA is usually less (sometimes much less) than the number of gates in an FPGA. Examples of object types include arithmetic logic units ("ALUs"), multiply/accumulate units ("MACs"), and memory banks such as register files ("RFs"). An FPOA's objects are typically designed in advance to have timing closure at high clock speeds.

A customer may desire a field-programmable device that is the same as or at least similar to an off-the-shelf high-end field-programmable device that might cost thousands or even tens of thousands of dollars. Rather than take on the expense of purchasing the high-end field-programmable device, the customer can instead purchase the same or similar field-programmable device functionality via the distributed execution environment 102 at what might cost the customer pennies or dollars per compute hour, or other similar comparatively low cost pricing model.

It is contemplated that the use of a field-programmable device may be charged in accordance with different pricing models based upon different facets of field-programmable device use. For example, FPGA design during which HDL code is created does not require access to the FPGAs 108, and as such, the pricing, if any, for such tasks may be charged in accordance with a compute pricing model for the virtual machine instance on which the HDL code is created, whereas the process of programming or "burning" the FPGAs 108 with the HDL code may be charged in accordance with a programming pricing model. As another example, testing the FPGAs 108 after programming may be charged in accordance with yet another pricing model. In other embodiments, the pricing model is static as a compute per hour for any use of the virtual machine instance 104.

In order to utilize a new instance, a customer of the distributed execution environment 102 might utilize a customer computing system 110 to transmit an instance launch request 112 to the distributed execution environment 102. The customer computing system 110 may be a server computer, a desktop or laptop personal computer, a tablet computer, a smartphone, a PDA, an e-reader, a game console, a set-top box, or any other computing device capable of accessing the distributed execution environment 102. The customer computing system 102 might access the distributed execution environment 102 over a suitable data communications network, such as a wide area network ("WAN") 108.

The instance launch request 112 can specify the type and configuration for a new instance of a computing resource to be instantiated in the distributed execution environment 102. For example, in the case where a customer is requesting to instantiate the virtual machine instance 104, the instance launch request 112 might specify a hardware configuration for the new instance, such as the amount of processing capability, memory capacity, and disk storage. The instance launch request 112 might also specify the type and number of field-programmable device resources. The instance launch request 112 might also specify an operating system that should be utilized by the new instance. The instance launch request 112 might also specify one or more software applications that should be utilized by the new instance. The software applications can include field-programmable device-specific software applications. In implementations that utilize the FPGAs 108, for example, an FPGA design application, an FPGA compiler application, an FPGA simulation application, and/or an FPGA programming application may be utilized. Examples of FPGA-specific software applications are described in greater detail below with reference to FIG. 5. Other software applications can include Web servers, application servers, databases, and the like. The instance launch request 112 might also specify other types of information, such as the geographic region and/or data center in which the new instance should be created. The instance launch request 112 might specify other types of configuration data when the customer is requesting to instantiate instances of other types of computing resources, such as the amount of storage requested in the case of instances of storage resources.

An instance launch manager 114 receives the instance launch request 112 in one implementation. In response to receiving the instance launch request 112, the instance launch manager 114 causes the new instance requested in the instance launch request 112 to be instantiated in the distributed execution environment 102. When the new instance is available for use, the instance launch manager 114 might generate and send a notification that the new instance is available for use ("instance available notification 116") to the customer computing system 110.

The customer computing system 110 can execute an operating system 118 and one or more application programs, such as, for example, a web browser application 120, and an instance management application 122. The operating system 118 is a computer program for controlling the operation of the customer computing system 110. According to one embodiment, the operating system 118 includes the LINUX operating system. According to another embodiment, the operating system 118 includes the WINDOWS® operating system from MICROSOFT Corporation. According to further embodiments, the operating system 118 may include the UNIX or SOLARIS operating systems. It should be appreciated that other operating systems may also be utilized. The application programs are executable programs configured to execute on top of the operating system 118 to provide various functions.

The web browser application 120 is an application program through which a user can access information resources on the web via a network, such as the wide area network 108. In some embodiments, the web browser application 120 allows a user to access a website hosted by or for the distributed execution environment 102. The website may provide a web-based GUI through which a user can browse instances, search instances, review documentation for the distributed execution environment 102 and available instance types, create and manage user accounts, provide instance launch requests, manage launched instances (e.g., startup, shutdown, or terminate), and otherwise interact with the distributed execution environment 102.

The instance management application 122 is an application program through which a user can create and manage user accounts associated with the distributed execution environment 102. The instance management application 122 can also allow a user to browse instances, search instances, review documentation for the distributed execution environment 102 and available instance types, provide instance launch requests, manage launched instances (e.g., startup, shutdown, or terminate), and otherwise interact with the distributed execution environment 102.

Although computing resources are sometimes described as being made available for purchase via the distributed execution environment 102, it should be understood that some computing resources, such as those offered in particular instance types of the virtual machine instances 104, may be offered for free. In this manner, potential customers can try the services offered by the distributed execution environment 102 before committing to the purchase of computing resources. It also should be understood that the computing resources offered by the distributed execution environment 102 may include both dedicated and shared resources so that customers can purchase compute time on dedicated hardware rather than sharing hardware with other customers.

Figure 2:
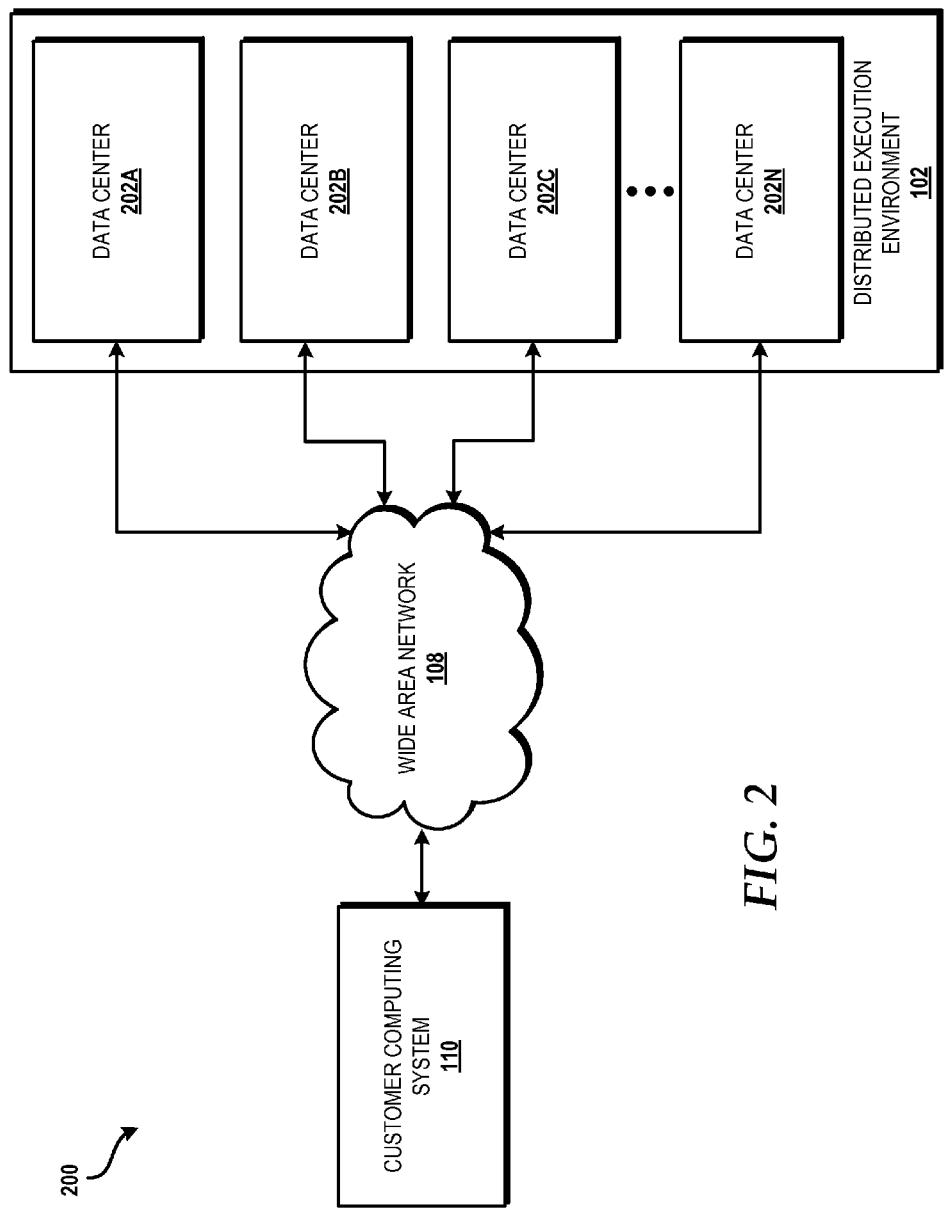
FIG. 2 is a system and network diagram that shows an illustrative operating environment that includes a distributed execution environment configured for providing access to field-programmable devices, according to one embodiment disclosed herein.

FIG. 2 and the following description are intended to provide a brief, general description of a suitable computing environment in which the embodiments described herein may be implemented. In particular, FIG. 2 is a system and network diagram that shows an illustrative operating environment 200 that includes a distributed execution environment 102 configured for providing customers access to FPGAs, according to one embodiment disclosed herein.

As discussed briefly above, the distributed execution environment 102 can provide instances of computing resources on a permanent or an as-needed basis. The instances of computing resources provided by the distributed execution environment 102 may include various types of resources, such as the field-programmable device resources 106, data processing resources, data storage resources, data communication resources, and the like. Each type of computing resource may be general-purpose or may be available in a number of specific configurations. Instances of the field-programmable device resources 106 may be configured with one or more physical field-programmable devices and/or one or more virtual field-programmable devices. Instances of data processing resources may be available as virtual machine instances in a number of different configurations. The virtual machine instances may be configured to execute applications, including Web servers, application servers, media servers, database servers, and other types of applications. Instances of data storage resources may include file storage devices, block storage devices, and the like. Instances of remote desktop sessions might also be utilized in various embodiments presented herein. A remote desktop session may be established utilizing the remote desktop protocol ("RDP") or another similar protocol for viewing and interacting with a graphical user interface provided by another computer. It should be understood that an instance may include any combination of the various types of resources described above.

Each type or configuration of an instance of a computing resource may be available in different sizes, such as large resources, consisting of many processors, large amounts of memory, and/or large storage capacity, and small resources consisting of fewer processors, smaller amounts of memory, and/or smaller storage capacity. Additional details regarding the various types of resources offered by the distributed execution environment 102 will be provided below with regard to FIG. 4.

The instances of computing resources provided by the distributed execution environment 102 are enabled in one implementation by one or more data centers 202A-202N (which may be referred herein singularly as "a data center 202" or in the plural as "the data centers 202"). The data centers 202 are facilities utilized to house and operate computer systems and associated components. The data centers 202 typically include redundant and backup power, communications, cooling, and security systems. The data centers 202 might also be located in geographically disparate locations. One illustrative configuration for a data center 202 that implements the concepts and technologies disclosed herein for providing field-programmable devices in a distributed execution environment will be described below with regard to FIG. 3.

The customers and other consumers of the distributed execution environment 102 may access the computing resources provided by the data centers 202 over the WAN 108. Although a WAN is illustrated in FIG. 2, it should be appreciated that a local-area network ("LAN"), the Internet, or any other networking topology known in the art that connects the data centers 202 to remote customers and/or other users may be utilized. It should also be appreciated that combinations of such networks might also be utilized.

Figure 3:
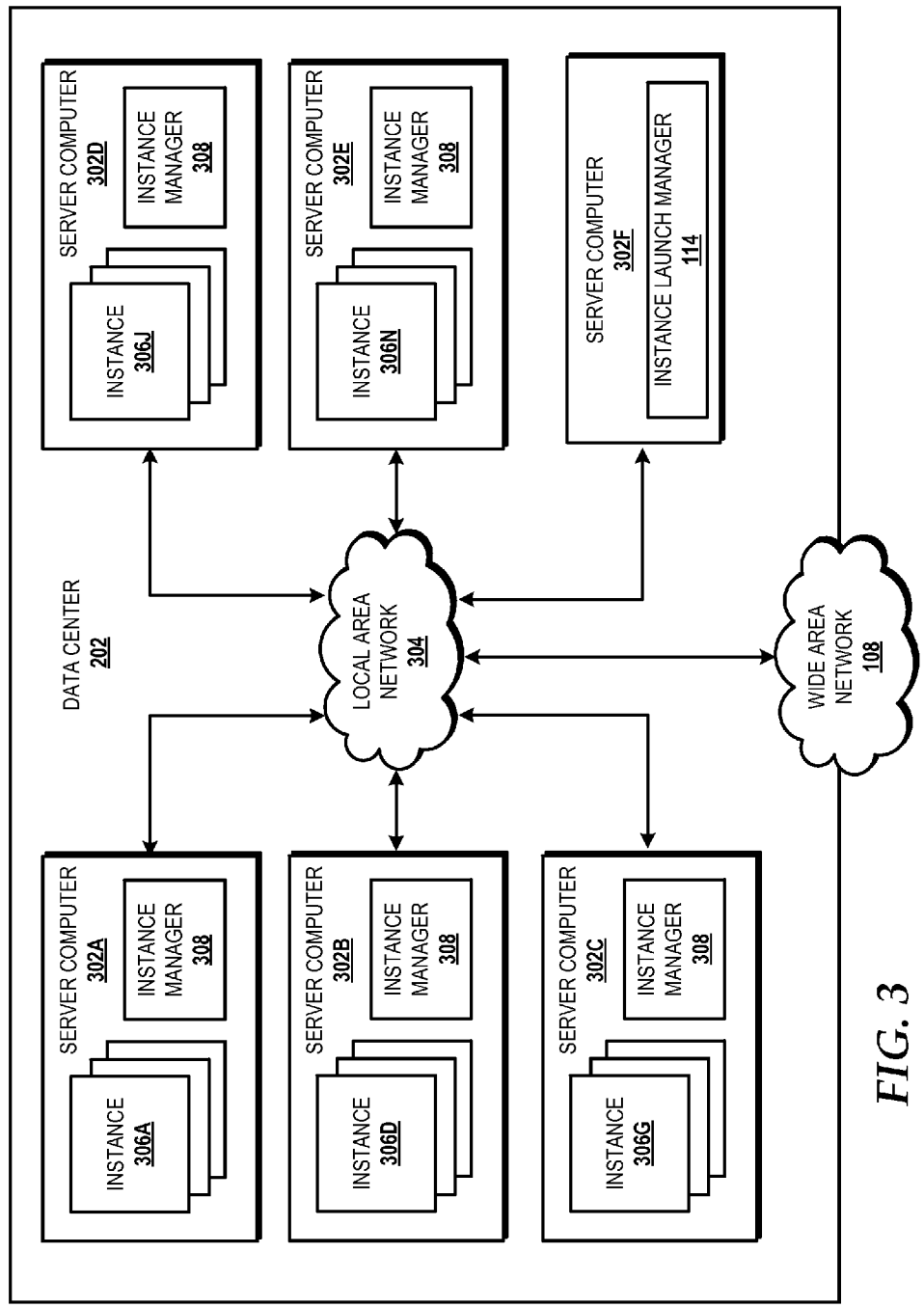
FIG. 3 is a computing system diagram that illustrates one configuration for a data center that implements aspects of the concepts and technologies disclosed herein for providing field-programmable devices in a distributed execution environment, according to one embodiment disclosed herein.

FIG. 3 is a computing system diagram that illustrates one configuration for a data center 202 that can be used to implement the distributed execution environment 102, including the concepts and technologies disclosed herein for providing field-programmable devices within a distributed execution environment. The example data center 202 shown in FIG. 3 includes several server computers 302A-302F (which may be referred herein singularly as "the server computer 302" or in the plural as "the server computers 302") for providing instances of computing resources. The server computers 302 may be standard tower or rack-mount server computers configured appropriately for providing the computing resources described herein. For example, in one implementation the server computers 302 are configured to provide instances 306A-306N of computing resources, including the field-programmable device resources 106 and other computing resources described herein.

In one embodiment, the instances 306A-306N (which may be referred herein singularly as "the instance 306" or in the plural as "the instances 306") are virtual machine instances. As known in the art, a virtual machine instance is an instance of a software implementation of a machine (e.g., a computer) that executes programs like a physical machine. Each of the servers 302 may be configured to execute an instance manager 308 capable of instantiating and managing instances of computing resources. In the case of virtual machine instances, for example, the instance manager 308 might be a hypervisor or another type of program configured to enable the execution of multiple virtual machine instances 306 on a single server computer 302, for example.

It should be appreciated that although the embodiments shown in FIG. 3 are described primarily in the context of virtual machine instances, other types of instances of computing resources can be utilized with the concepts and technologies disclosed herein. For instance, the technologies disclosed herein might be utilized with instances of hardware resources such as the field-programmable device resources 106, instances of storage resources, instances of data communications resources, and with other types of resources.

The data center 202 shown in FIG. 3 also includes a server computer 302F reserved for executing software components for managing the operation of the data center 202, the server computers 302, and the instances 306. In particular, the server computer 302F might execute the instance launch manager 114. Additional details regarding the operation of the instance launch manager 106 will be described below with regard to FIGS. 6, 8, and 9.

In the example data center 202 shown in FIG. 3, an appropriate LAN 304 is utilized to interconnect the server computers 302A-302E and the server computer 302F. The LAN 304 is also connected to the WAN 108, which was introduced in FIG. 1. It should be appreciated that the network topology illustrated in FIGS. 1-3 has been greatly simplified and that many more networks and networking devices may be utilized to interconnect the various computing systems disclosed herein. Appropriate load balancing devices or software modules might also be utilized for balancing a load between each of the data centers 202A-202N, between each of the server computers 302A-302F in each data center 202, and between instances 306 of computing resources purchased by each customer of the distributed execution environment 102.

It should be appreciated that the data center 202 described in FIG. 3 is merely illustrative and that other implementations might be utilized. In particular, functionality described herein as being performed by the instance launch manager 114 might be performed by one or more other components. Additionally, it should be appreciated that the functionality provided by these components might be implemented in software, hardware, or a combination of software and hardware. Other implementations should be apparent to those skilled in the art.

Figure 4:
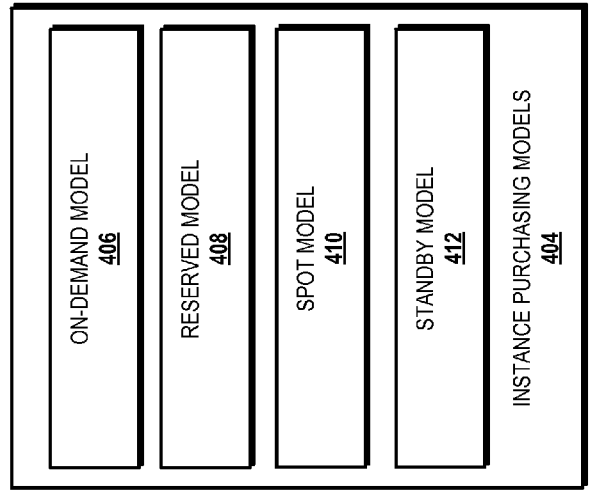
FIG. 4 is a block diagram showing aspects of various virtual machine instance types and instance purchasing models that might be utilized in the embodiments disclosed herein.
Figure 4:
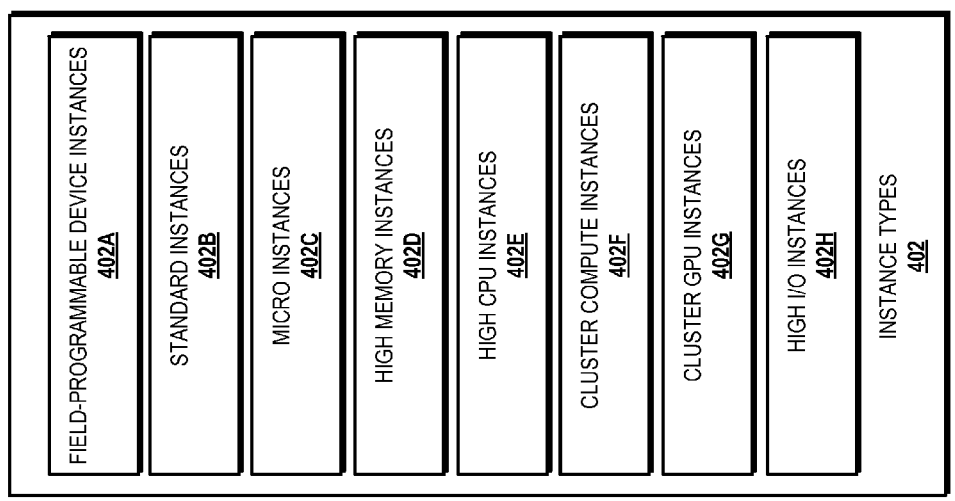

FIG. 4 is a block diagram illustrating several types of instances ("instance types 402") of computing resources, along with several purchasing models ("instance purchasing models") that might be utilized to set the price for instances, available within the distributed execution environment 102, according to embodiments disclosed herein. As described briefly above, the instances of computing resources provided by the distributed execution environment 102 may be made available to customers in a number of different types, or configurations. The example instance types 402 shown in FIG. 4 indicates that the following instance types are available for use within the distributed execution environment 102: field-programmable device instances 402A; standard instances 402B; micro instances 402C; high memory instances 402D; high central processing unit ("CPU") instances 402E; cluster compute instances 402F; cluster graphics processing unit ("GPU") instances 402G; and high input/output ("I/O") instances 402H. Aspects of each of these instance types will be described below.

Field-programmable device instances 402A are instances that are configured with at least a portion of the field-programmable device resources 106. As described above, the field-programmable device resources 106 can include physical field-programmable devices, such as the FPGAs 108, and/or virtual field-programmable devices. Field-programmable device instances 402A may be suitable for any application for which an field-programmable device is suitable. Field-programmable device instances 402A may be made available in various sizes in some embodiments. For example, "small", "medium", "large", and "extra-large" field-programmable device instances may be made available, with each of these instances having greater amounts of logic blocks and interconnects, or other hardware configurations. In some embodiments, a "small" field-programmable device instance, or other size field-programmable device instance, may be a virtualized field-programmable device instance that operates along with one or more other "small" or other size instances on a single physical field-programmable device that may itself be associated with a larger field-programmable device instance, such as, for example, a "large" field-programmable device instance. Alternatively, a virtual field-programmable device may include multiple physical field-programmable devices.

Standard instances 402B are instances that are configured with generally proportional amounts of CPU and memory. Standard instances 402B may be suitable for common computing applications. Standard instances may be made available in various sizes in some embodiments. For example, "small", "medium", "large", and "extra-large" instances may be made available, with each of these instances having greater amounts of CPU and memory, while maintaining approximately similar ratios of CPU to memory.

Micro instances 402C are instances that provide a small amount of consistent CPU resources and allow CPU capacity to be increased in short bursts when additional cycles are available. Micro instances may be suited for lower throughput applications and Web sites that require additional compute cycles periodically.

High memory instances 402D are instances that have proportionally more random access memory ("RAM") resources than CPU resources. High memory resources are suitable for high throughput applications, including database and memory caching applications. For example, various types of high memory instances might offer between 17.1 and 68.4 GB of RAM in some implementations. Larger main memory sizes might also be made available to customers of the distributed execution environment 102. In contrast, high CPU instances 402E have proportionally more CPU resources than RAM memory resources and are well-suited for compute-intensive applications.

Cluster compute instances 402F are instances that offer proportionally high CPU resources with increased network performance. Cluster compute instances 402F are well-suited for High Performance Compute ("HPC") applications and other demanding network-bound applications. Cluster GPU instances 402F are instances that provide general-purpose GPUs with proportionally high CPU and increased network performance for applications benefiting from highly parallelized processing, including HPC, rendering and media processing applications. While cluster compute instances 402F provide the ability to create clusters of instances connected by a low latency, high throughput network, cluster GPU instances 402G provide an additional option for applications that can benefit from the efficiency gains of the parallel computing power of GPUs over what can be achieved with traditional processors.

High I/O instances 402H are instances that provide very high disk I/O performance and are well-suited for many high performance database workloads. High I/O instances 402H may utilize solid-state drive ("SSD")-based local instance storage for high I/O throughput. High I/O instances 402H might also provide high levels of CPU, memory, and network performance.

It should be appreciated that the various instance types described above are merely illustrative. Other instance types not described herein might be utilized with the various concepts and technologies described herein. Additionally, in some embodiments, instances may be made available in various sizes having continuous ratios of CPU to memory. Additionally, as discussed above, the embodiments disclosed herein might also be utilized with other types of instances of computing resources.

It should also be appreciated that the various instance types described above might be utilized with various operating systems. For example, a customer of the distributed execution environment 102 might request to execute a high CPU virtual machine instance executing the LINUX operating system. Similarly, a customer or other user of the of the distributed execution environment 102 might request to use a cluster compute instance executing the MICROSOFT WINDOWS SERVER operating system. Other operating systems might also be utilized.

As also shown in FIG. 4, the various virtual machine instance types described above might be priced according to various instance purchasing models 404. For instance, in the example shown in FIG. 4, instances of computing resources may be priced according to an on-demand model 406, a reserved model 408, a spot model 410, or a standby model 412. Aspects of each of these instance purchasing models are described in greater detail below.

Instances of computing resources priced according to the on-demand model 406, which may be referred to herein as "regular" instances, are instances that are paid for and in active use by a customer. The on-demand model 406 allows customers of the distributed execution environment 102 to pay for capacity per unit of time, such as an instance-hour, without requiring a long-term commitment. This may free the customer from the costs and complexities of planning, purchasing, and maintaining hardware and transforms what are commonly large fixed costs into much smaller variable costs.

Instances of computing resources priced according to the reserved model 408, which might be referred to herein as "reserved instances", are instances of a computing resource that are reserved for a customer in exchange for a payment. The reserved model 408 provides a customer the option to make a one-time payment for each instance they want to reserve. In turn, the customer may receive a significant discount on the hourly usage charge for reserved instances as compared to on-demand instances. After the customer makes a one-time payment for reserved instances, the reserved instances are reserved for the customer and the customer has no further obligation. The customer may choose to run the reserved instances for the discounted usage rate for the duration of a chosen term. If the customer does not use the reserved instances, the customer will not pay usage charges on these instances.

The spot model allows customers to bid on unused capacity in the distributed execution environment 102. The customer can run the instances priced according to the spot model, which may be referred to herein as "spot instances", for as long as their bid exceeds a current market price, called the spot instance market price. The spot instance market price may fluctuate based upon the supply of instances and the customer demand for the instances. Spot instances may be terminated if a customer's maximum bid no longer exceeds the current spot instance market price.

In order to obtain spot instances, a customer places a request for spot instances that specifies the desired number of spot instances and the maximum price the customer is willing to pay per instance hour. If the customer's maximum price bid exceeds the current spot instance market price for the spot instances, the customer's request will be fulfilled and the customer's spot instances will run until either the customer chooses to terminate them or the market price increases above the customer's maximum price (whichever is sooner). Various components operating within the distributed execution environment 102 may manage the market for the spot instances, including setting the current spot instance market price for the spot instances.

Instances of computing resources purchased according to the standby model 412, which might be referred to as "standby instances," are spot instances that have been acquired on behalf of a customer and that are made ready for near immediate use by the customer in the manner described herein. The price charged for standby instances is typically less than the price charged for on-demand instances, since the standby instances may be terminated in the same manner as spot instances. In one embodiment, standby instances are priced higher than spot instances and reserved instances, but lower than on-demand instances. Standby instances might also be available for use faster than other instance types.

It should be appreciated that the various instance purchasing models 404 described above for on-demand instances, reserved instances, spot instances, and standby instances are merely illustrative and that other mechanisms may be utilized to set the pricing for the various instance types. It should also be appreciated that the embodiments disclosed herein may be utilized with any of the instance types and purchasing models 404 shown in FIG. 4 and other configurations of instances and purchasing models 404 not shown in FIG. 4. Additionally, it should be appreciated that instances of other types of computing resources might also be priced according to the instance purchasing models 404 shown in FIG. 4 or others.

Figure 5:
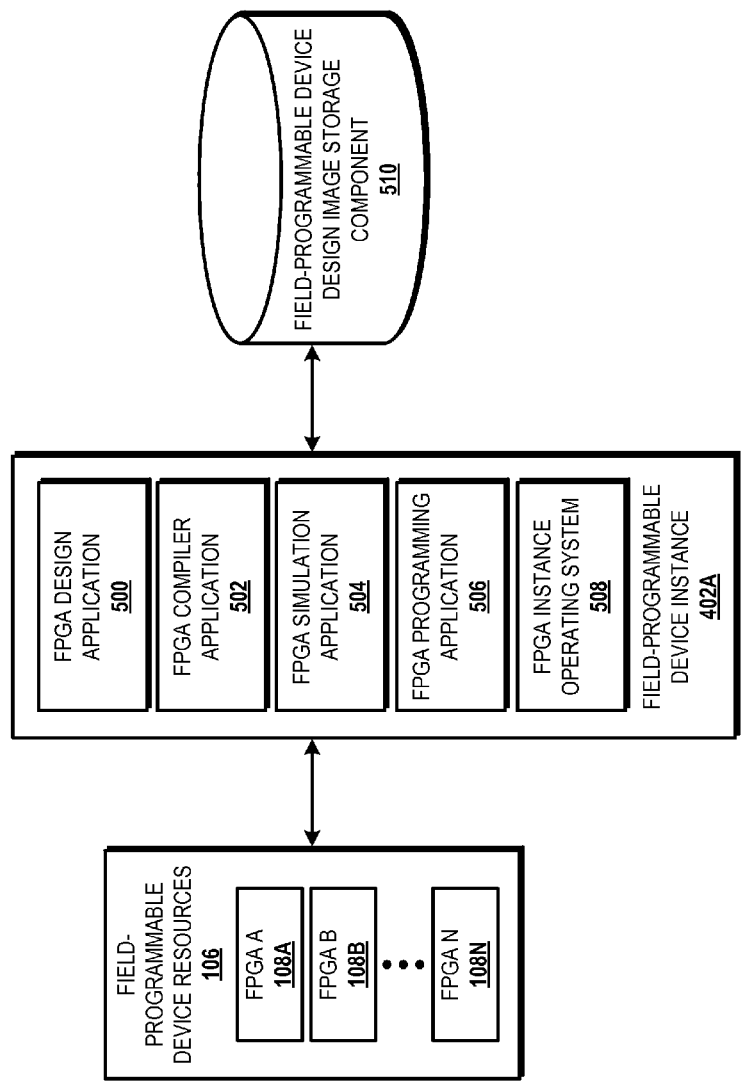
FIG. 5 is a block diagram showing aspects of an illustrative FPGA instance that might be utilized in the embodiments disclosed herein.

FIG. 5 is a block diagram showing aspects of an illustrative field-programmable device instance 402A that might be utilized in the embodiments disclosed herein. As described above, a field-programmable device instance 402A is an instance configured with at least a portion of the field-programmable device resources 106. In the illustrated example, the field-programmable device instance 402A includes an FPGA design application 500, an FPGA compiler application 502, an FPGA simulation application 504, an FPGA programming application 506, and an FPGA instance operating system 508. The field-programmable device instance 402A provides access to at least a portion of the field-programmable device resources 106, and more particularly, one or more of the FPGAs 108. The field-programmable device instance 402 might also provide access to a field-programmable device design image storage component 510. The FPGA instance 402A might also provide access to other resources that are not shown, such as, for example, CPU, GPU, memory, storage, and other hardware resources. The FPGA instance 402A might also include other software such as application servers, Web servers and the like. In some embodiments, the FPGA instance 402A provides access to at least a portion of the field-programmable device resources 106 without additional specification regarding the computer system(s) that facilitate connection to the field-programmable device resources 106. In this manner, the distributed execution environment 102 can offer FPGA instances for users that require access only to the field-programmable device resources 106 and no other computing resources. It should be understood that although the field-programmable device instance 402A is shown in a configuration to support utilization of one or more of the FPGAs 108, alternative configurations are contemplated to support utilization of other field-programmable devices, such as those described above.

The FPGA design application 500 is an application program configured to allow users to design the logic that is to be implemented within one or more of the FPGAs 108. The FPGA design application 500 can provide a mechanism through which users can create FPGA designs through the use of HDL code and/or graphical design techniques. In some embodiments, the FPGA design application 500 provides a text-based coding environment through which users can add HDL code to be compiled by the FPGA compiler application 502 and programmed or "burned" onto a target FPGA or a target fleet of FPGAs. In some other embodiments, the FPGA design application 500 provides a visual programming environment through which users can use graphical blocks that are abstractions of HDL code.

The FPGA compiler application 502 is an application program configured to allow users to compile HDL code created using the FPGA design application 500 or similar application that might be executed by the customer computing system 110. The FPGA compiler application 502 is configured to convert an FPGA design from code into a bitstream that can be downloaded into a target FPGA, such as one of the FPGAs 108, a virtualized FPGA operating on one of the FPGAs 108, or a virtualized FPGA that includes one or more of the FPGAs 108. The output of the FPGA compiler application 502 may include a number of files, including, for example, an FPGA design image, which a user may store locally in storage of the customer computing system 110 and/or in the field-programmable device design image storage component 510.

The FPGA programming application 506 is an application program configured to download compiled code to a target FPGA to program the target FPGA. Prior to programming a target FPGA, a user may desire to simulate their design using the FPGA simulation application 504. The FPGA simulation application 504 is an application program configured to provide a simulation environment for a target FPGA. The FPGA simulation application 504 can be useful for detecting issues with an FPGA design in software simulation prior to programming a target FPGA. The FPGA simulation application 504 may provide simulation models that include specifications similar to or the same as the target FPGA so that the simulations are an accurate representation of how the target FPGA will perform when programmed with a particular design.

The FPGA instance operating system 508 is a computer program for controlling the operation of the FPGA instance 402A. According to one embodiment, the FPGA instance operating system 508 includes the LINUX operating system. According to another embodiment, the FPGA instance operating system 508 includes the WINDOWS® operating system from MICROSOFT Corporation. According to further embodiments, the FPGA instance operating system 508 may include the UNIX or SOLARIS operating systems. It should be appreciated that other operating systems may also be utilized. The application programs described above are executable programs configured to execute on top of the FPGA instance operating system 508 to provide at least the functions described above.

The field-programmable device design image storage component 510 can include one or more hard disks, solid-state drives, other storage components, or portions thereof, which might be dedicated to the storage of FPGA designs. In some embodiments, a customer can launch the FPGA instance 402A and save a number of field-programmable device designs to the field-programmable device design image storage component 510 for later use. The FPGA design image storage component 510 provides storage within the FPGA instance 402A, although FPGA designs may additionally or alternatively be provided by the customer computing system 110 or other systems via upload to the distributed execution environment 102. It is contemplated that the field-programmable device design image storage component 510 may be made accessible via a customer's computing system, such as the customer computing system 110, and/or via instances other than the FPGA instances 402A operating within the distributed computing environment 102.

In some embodiments, field-programmable device images may be offered via a marketplace accessible, for example, via one or more web pages. Field-programmable device images offered via the marketplace may be created by users of the distributed execution environment 102 and/or by one or more entities (e.g., engineers, developers, or other personnel) that support the distributed execution environment 102. In some embodiments, field-programmable device images are offered via the marketplace for free or for a fee. The marketplace might additionally or alternatively offer code used to program or "burn" a field-programmable device offered through the distributed execution environment 102.

A user may desire to create and test multiple field-programmable device designs before deciding on a design that they would like to implement in fabricated hardware. For these scenarios, the distributed execution environment 102 may offer a "send to fabrication" service through which a user can request to have their design sent to a device fabrication plant for fabrication. The device fabrication plant may be owned and/or operated by the same entity that owns and/or operates the distributed execution environment 102 or by some other entity. In some implementations, multiple device fabrication plants may advertise their services via the distributed execution environment 102. The device fabrication plants may bid on fabrication jobs presented by users of the distributed execution environment 102.

Figure 6:
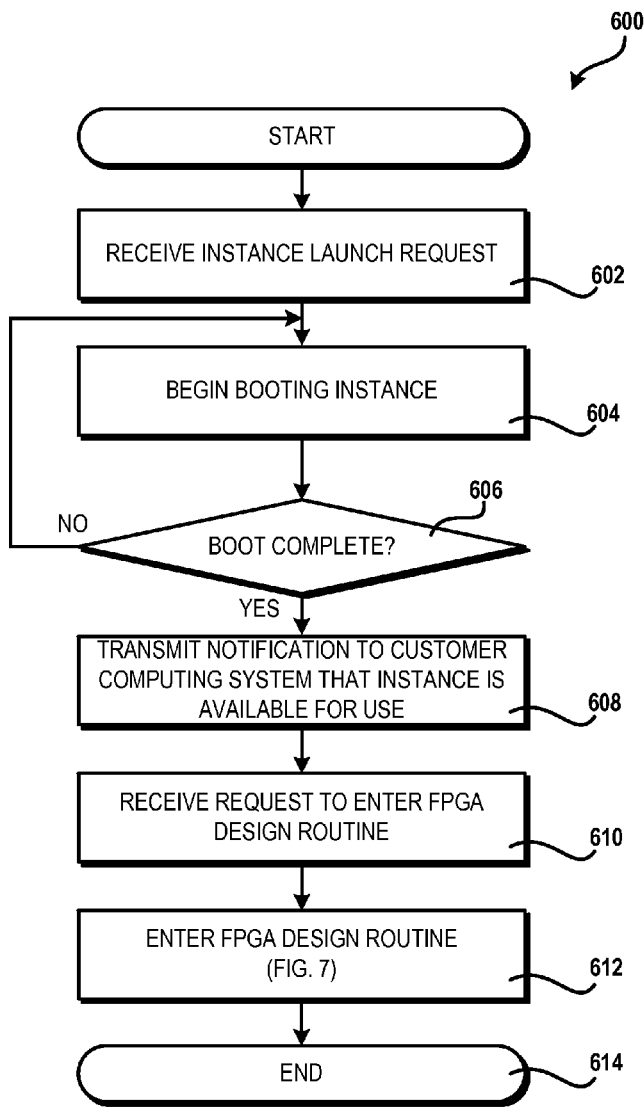
FIG. 6 is a flow diagram showing aspects of a method for launching an FPGA instance within a distributed execution environment and entering an FPGA design routine to allow a customer to create FPGA designs, according to an illustrative embodiment.

FIG. 6 is a flow diagram showing a method 600 for launching an FPGA instance within a distributed execution environment and entering an FPGA design method to allow a customer to create FPGA designs, according to one embodiment. It should be appreciated that the logical operations described herein with respect to FIG. 6 and the other figures are implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Although the embodiments illustrated in FIGS. 6-9 specifically show the use of FPGAs, other field-programmable devices may be used in addition to or as an alternative to FPGAs. As such, the embodiments illustrated in FIGS. 6-9 should not be construed as being limiting in any way.

The method 600 begins at operation 602, where the instance launch manager 114 receives an instance launch request, such as the instance launch request 112. As described above, the instance launch request 112 requests that a new instance of a computing resource be instantiated in the distributed execution environment 102. For example, the instance launch request 112 might request to create and execute a new virtual machine instance having a specified configuration that includes at least some of the field-programmable device resources 106 and that utilizes a specified operating system.

From operation 602, the method 600 proceeds to operation 604, where the new instance is instantiated by the instance launch manager 114 in the distributed execution environment 102. For example, in the case of a virtual machine instance, a server 302 in the distributed execution environment 102 might begin booting the new instance. From operation 604, the method 600 proceeds to operation 606, where the instance launch manager 114 determines if the new instance has become available for use (i.e., finished booting in the case of a virtual machine instance). When the new instance has become available for use, the method 600 proceeds from operation 606 to operation 608.

At operation 608, the instance launch manager 114 might transmit a notification, such as the instance available notification 116, to the customer computing system 110 that the new instance is now available for use. Other types of information might also be displayed. Additionally, other types of workflows might also be triggered once a new instance has become available for use.

From operation 608, the method 600 proceeds to operation 610, where the new instance receives a request to enter an FPGA design routine through which a customer can create one or more FPGA designs to be programmed into one or more FPGAs exposed by the new instance. From operation 610, the method 600 proceeds to operation 612, where the new instance enters an FPGA design routine in response to the request received at operation 610. An illustrative FPGA design routine is described herein below with reference FIG. 7. From operation 612, the method 600 proceeds to operation 614, where the method 600 ends.

In some embodiments, the instance launch request received at operation 602 might include additional information to automate at least a portion of the remaining operations of the method 600. For example, the instance launch request might include the request to enter the FPGA design routine at operation 610, and if so, the new instance can enter the FPGA design routine automatically, thus not requiring further user interaction beyond the initial instance launch request.

Figure 7:
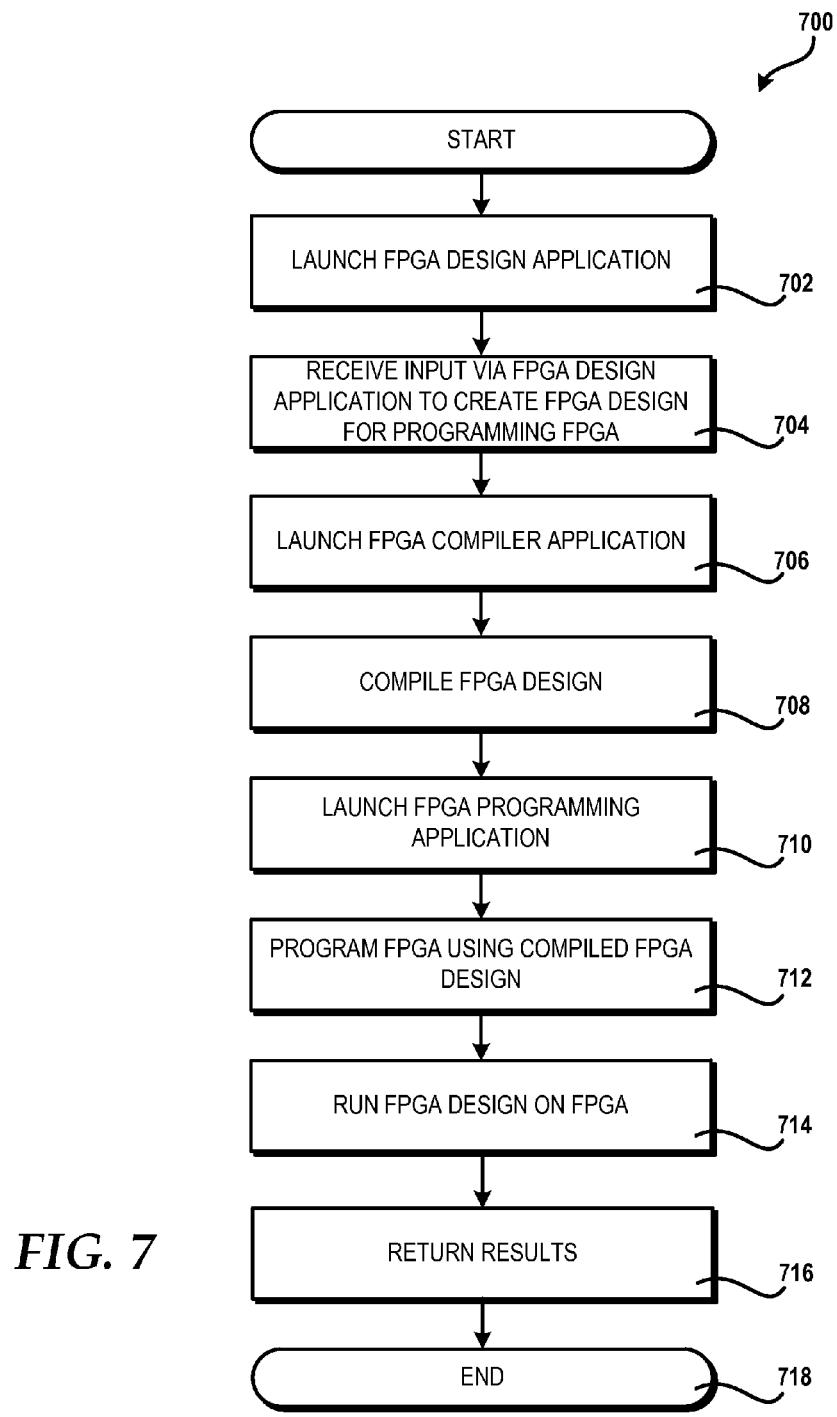
FIG. 7 is a flow diagram showing aspects of a method for designing an FPGA within a distributed execution environment, according to an illustrative embodiment.

FIG. 7 is a flow diagram showing aspects of a method 700 for designing an FPGA within a distributed execution environment, according to one embodiment. The method 700 begins and proceeds to operation 702, where the new instance instantiated in FIG. 6 launches the FPGA design application 500. From operation 702, the method 700 proceeds to operation 704, where the new instance receives input via the FPGA design application 500 to create a new FPGA design for programming a target FPGA that is exposed by the new instance.

From operation 704, the method 700 proceeds to operation 706, where the new instance launches the FPGA compiler application 502. From operation 706, the method 700 proceeds to operation 708, where the FPGA compiler application 502 compiles the code provided at operation 704 during the creation of the FPGA design using the FPGA design application 500.

From operation 708, the method 700 proceeds to operation 710, where the new instance launches the FPGA programming application 506. From operation 710, the method 700 proceeds to operation 712, where the FPGA programming application 506 programs the target FPGA using the compiled FPGA design created at operation 708. From operation 712, the method 700 proceeds to operation 714, where the new instance causes the target FPGA to run.

From operation 714, the method 700 proceeds to operation 716, wherein the new instance returns results of running the FPGA. The results can be returned to the customer computing system 110. The results generally might be an outcome of running the FPGA, such as successful or unsuccessful. The results might additionally or alternatively include output provided by the target FPGA. The output might be visual, audial, haptic, or any other type of output. In some embodiments, the output is received by the customer computing system 110, which utilizes the output to perform some function, such as, for example, operating a robot that is controlled at least partially by the target FPGA. From operation 716, the method 700 proceeds to operation 718, where the method 700 ends.

If the outcome of running the FPGA is determined to be unsuccessful, or if the FPGA is not performing in accordance with conditions provided by the customer, then an auto-scaling function can be initiated. Auto scaling allows customers to scale field-programmable device instances up or down automatically according to conditions they define. For example, if at operation 714, the target FPGA fails to run, runs poorly, or at operation 716, the results are not conducive to the expectations of the customer as defined in one or more conditions, the auto-scaling function can launch an FPGA with more resources and redo one or more of the operations 702-716. Likewise, the auto-scaling function can be used to scale down the FPGA(s) used by a particular instance based upon, for example, the conditions provided by the customer.

In some embodiments, the instance launch request received at operation 602 might include additional information to automate at least a portion of the operations of the method 700. For example, the instance launch request received at operation 602 might include the request to enter the FPGA design routine at operation 610, and to perform one or more of the operations 702-714. In this manner, a user can describe what they want the FPGA instance to do upon launch without further input. It is contemplated that the user may intervene to overtake control of the FPGA instance should the FPGA instance operate in a manner inconsistent with the user's expectations.

Figure 8:
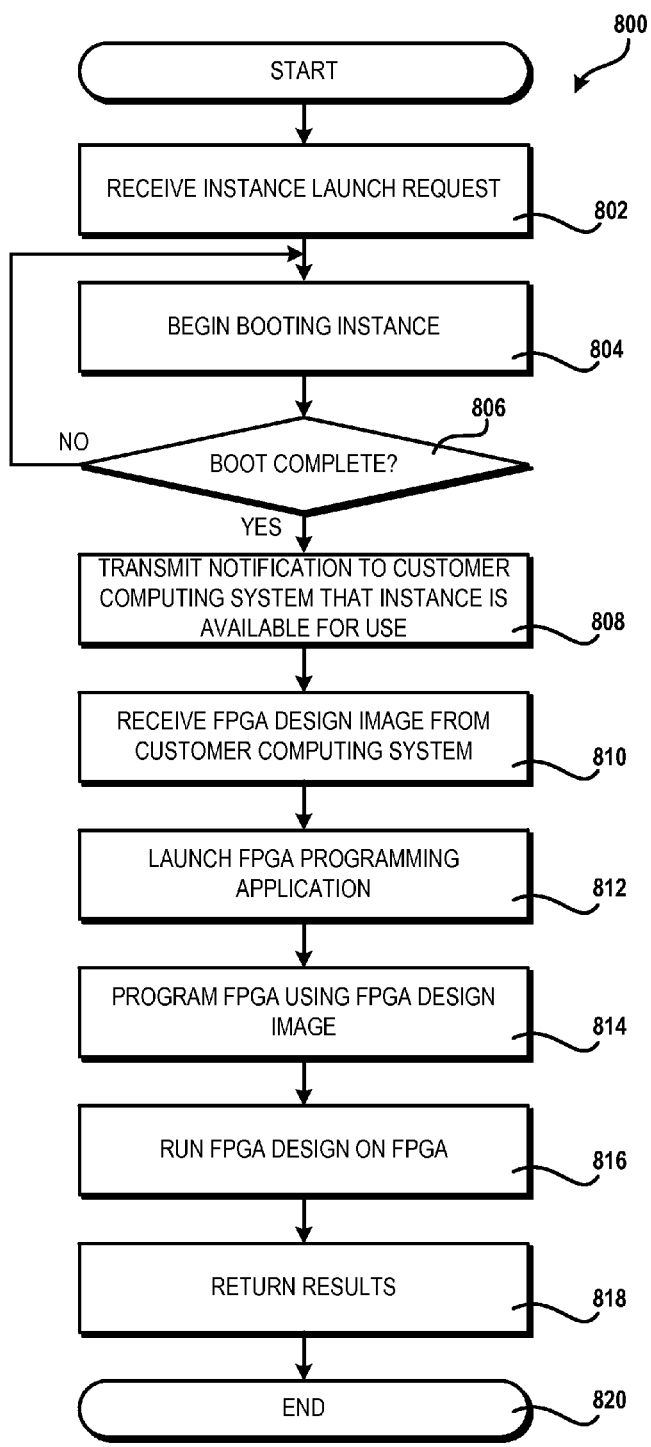
FIG. 8 is a flow diagram showing aspects of a method for launching an FPGA instance within a distributed execution environment and utilizing an FPGA design image received from a customer computing device that is connected to the FPGA instance to program an FPGA, according to an illustrative embodiment.

FIG. 8 is a flow diagram showing aspects of a method for launching an FPGA instance within a distributed execution environment and utilizing an FPGA design image received from a customer computing device that is connected to the FPGA instance to program an FPGA, according to an illustrative embodiment. The method 800 begins at operation 802, where the instance launch manager 114 receives an instance launch request 112. As described above, the instance launch request 112 requests that a new instance of a resource be instantiated in the distributed execution environment 102. For example, the instance launch request 112 might request to create and execute a new virtual machine instance having a specified configuration and utilizing a specified operating system.

From operation 802, the method 800 proceeds to operation 804, where the new instance is instantiated in the distributed execution environment 102. For example, in the case of a virtual machine instance, a server 302 in the distributed execution environment 102 might begin booting the new instance. From operation 804, the method 800 proceeds to operation 806, where the instance launch manager 114 determines if the new instance has become available for use (i.e., finished booting in the case of a virtual machine instance). When the new instance has become available for use, the method 800 proceeds from operation 806 to operation 808.

At operation 808, the instance launch manager 114 might transmit a notification to the customer computing system 102 that the new instance is now available for use. Other types of information might also be displayed. Additionally, other types of workflows might also be triggered once a new instance has become available for use.

From operation 808, the method proceeds to operation 810, where the new instance receives an FPGA design image from the customer computing system 106. From operation 810, the method 800 proceeds to operation 812, where the new instance launches the FPGA program application 506.

From operation 812, the method 800 proceeds to operation 814, where the new instance programs an FPGA using the FPGA design image received at operation 810. From operation 814, the method 800 proceeds to operation 816, where the new instance runs the FPGA design on the FPGA. From operation 816, the method 800 proceeds to operation 818, wherein the new instance returns results of running the FPGA. The results can be returned to the customer computing system 110. The results generally might be an outcome of running the FPGA, such as successful or unsuccessful. The results might additionally or alternatively include output provided by the target FPGA. The output might be visual, audial, haptic, or any other type of output. In some embodiments, the output is received by the customer computing system 110, which utilizes the output to perform some function, such as, for example, operating a robot that is controlled at least partially by the target FPGA. From operation 818, the method 800 proceeds to operation 820, where the method 800 ends.

If the outcome of running the FPGA is determined to be unsuccessful, or if the FPGA is not performing in accordance with conditions provided by the customer, then an auto-scaling function can be initiated. Auto scaling allows customers to scale field-programmable device instances up or down automatically according to conditions they define. For example, if at operation 816, the target FPGA fails to run, runs poorly, or at operation 818, the results are not conducive to the expectations of the customer as defined in one or more conditions, the auto-scaling function can launch an FPGA with more resources and redo one or more of the operations 810-818. Likewise, the auto-scaling function can be used to scale down the FPGA(s) used by a particular instance based upon, for example, the conditions provided by the customer.

In some embodiments, the instance launch request received at operation 802 might include additional information to automate at least a portion of the remaining operations of the method 800. For example, the instance launch request might include the FPGA design image selected by the user instead of receiving the FPGA design image in a separate communication from the customer computing system 110 at operation 810. Other operations, such as operation 812-816, may be configured in the instance launch request to be performed automatically.

Figure 9:
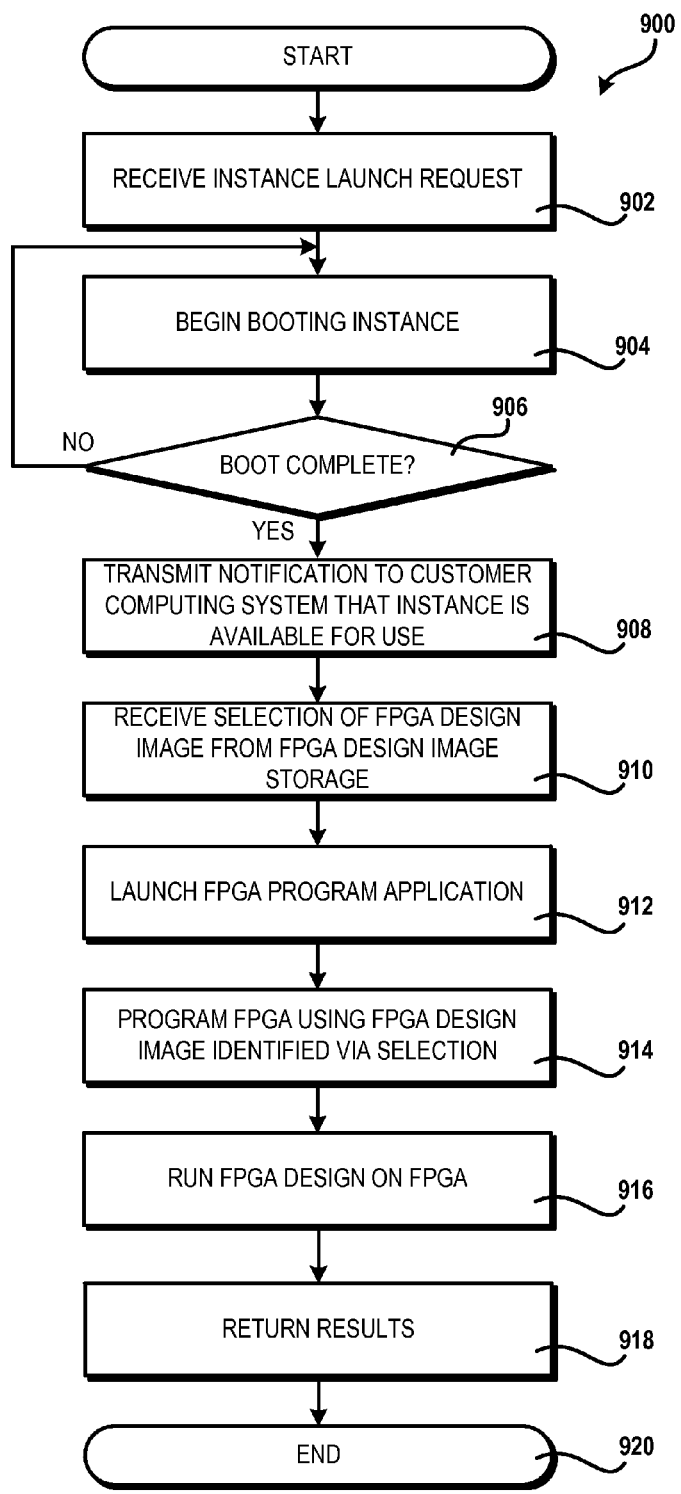
FIG. 9 is a flow diagram showing aspects of a method for launching an FPGA instance within a distributed execution environment and utilizing an FPGA design image selected from an FPGA design image storage component to program an FPGA, according to an illustrative embodiment.

FIG. 9 is a flow diagram showing aspects of a method 900 for launching an FPGA instance within a distributed execution environment and utilizing an FPGA design image selected from an FPGA design image storage component to program an FPGA, according to an illustrative embodiment. The method 900 begins at operation 902, where the instance launch manager 114 receives an instance launch request 112. As described above, the instance launch request 112 requests that a new instance of a computing resource be instantiated in the distributed execution environment 109. For example, the instance launch request 112 might request to create and execute a new virtual machine instance having a specified configuration and utilizing a specified operating system.

From operation 902, the method 900 proceeds to operation 904, where the new instance is instantiated in the distributed execution environment 106. For example, in the case of a virtual machine instance, a server 302 in the distributed execution environment 106 might begin booting the new instance. From operation 904, the method 900 proceeds to operation 906, where the instance launch manager 114 determines if the new instance has become available for use (i.e., finished booting in the case of a virtual machine instance). When the new instance has become available for use (i.e., finished booting in the case of a virtual machine instance), the method 900 proceeds from operation 906 to operation 908.

At operation 908, the instance launch manager 114 might transmit a notification to the customer computing system 102 that the new instance is now available for use. Other types of information might also be displayed. Additionally, other types of workflows might also be triggered once a new instance has become available for use.

From operation 908, the method 900 proceeds to operation 910, where the new instance receives a selection of an FPGA design image from an FPGA design image storage components, such as the field-programmable device design image storage 510 illustrated in FIG. 5. From operation 910, the method 900 proceeds to operation 912, where the new instance launches the FPGA program application 506. From operation 912, the method 900 proceeds to operation 914, where the new instance programs an FPGA using the FPGA design image selected at operation 910.

From operation 914, the method 900 proceeds to operation 916, where the new instance runs the FPGA design on the FPGA. From operation 916, the method 900 proceeds to operation 918, wherein the new instance returns results of running the FPGA. The results can be returned to the customer computing system 110. The results generally might be an outcome of running the FPGA, such as successful or unsuccessful. The results might additionally or alternatively include output provided by the target FPGA. The output might be visual, audial, haptic, or any other type of output. In some embodiments, the output is received by the customer computing system 110, which utilizes the output to perform some function, such as, for example, operating a robot that is controlled at least partially by the target FPGA. From operation 918, the method 900 proceeds to operation 920, where the method 900 ends.

If the outcome of running the FPGA is determined to be unsuccessful, or if the FPGA is not performing in accordance with conditions provided by the customer, then an auto-scaling function can be initiated. Auto scaling allows customers to scale field-programmable device instances up or down automatically according to conditions they define. For example, if at operation 916, the target FPGA fails to run, runs poorly, or at operation 818, the results are not conducive to the expectations of the customer as defined in one or more conditions, the auto-scaling function can launch an FPGA with more resources and redo one or more of the operations 910-918. Likewise, the auto-scaling function can be used to scale down the FPGA(s) used by a particular instance based upon, for example, the conditions provided by the customer.

In some embodiments, the instance launch request received at operation 902 might include additional information to automate at least a portion of the remaining operations of the method 900. For example, the instance launch request might include the FPGA design image selected by the user from the field-programmable device design image storage 510 instead of receiving the selection in a separate communication from the customer computing system 110 at operation 910. Other operations, such as operation 912-916, may be configured in the instance launch request to be performed automatically.

Figure 10:
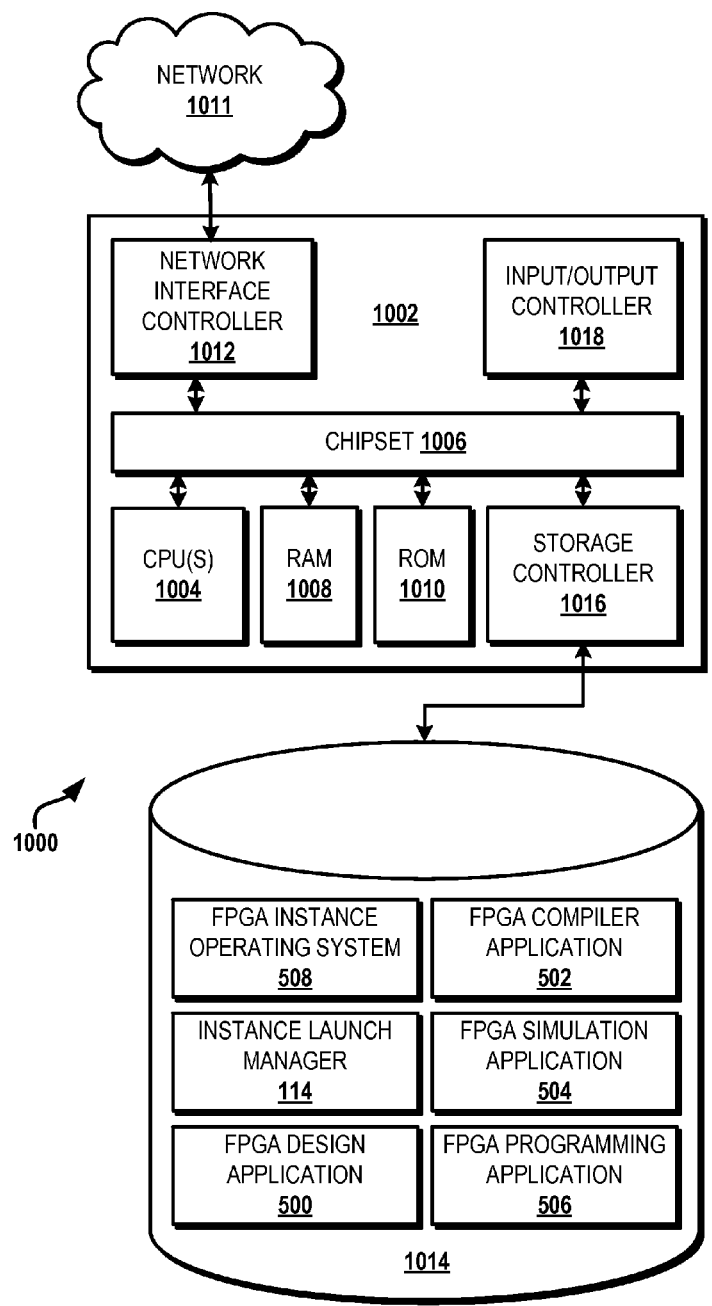
FIG. 10 is a computer architecture diagram showing one illustrative computer hardware architecture for use in computing devices configured to implement the concepts and technologies disclosed herein in one embodiment.

FIG. 10 shows an example computer architecture for a computer 1000 capable of executing the program components described above for providing FPGAs in a distributed execution environment. The computer architecture shown in FIG. 10 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein described as executing within the data centers 202A-202N, on the server computers 302A-302F, or on any other computing system mentioned herein.

The computer 1000 includes a baseboard 1002, or "motherboard," which is a printed circuit board to which a multitude of components or devices may be connected by way of a system bus or other electrical communication paths. In one illustrative embodiment, one or more central processing units ("CPUs") 1004 operate in conjunction with a chipset 1006. The CPUs 1004 may be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 may provide an interface to a random access memory ("RAM") 1008, used as the main memory in the computer 1000. The chipset 1006 may further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM may also store other software components necessary for the operation of the computer 1000 in accordance with the embodiments described herein.

The computer 1000 may operate in a networked environment using logical connections to remote computing devices and computer systems through a network 1011, such as the WAN 108 or the local area network 304. The chipset 1006 may include functionality for providing network connectivity through a network interface controller ("NIC") 1012, such as a gigabit Ethernet adapter. The NIC 1012 is capable of connecting the computer 1000 to other computing devices over the network 1011. It should be appreciated that multiple NICs 1012 may be present in the computer 1000, connecting the computer to other types of networks and remote computer systems.

The computer 1000 may be connected to a mass storage device 1014 that provides non-volatile storage for the computer. The mass storage device 1014 may store system programs, application programs, other program modules, and data, which have been described in greater detail herein. The mass storage device 1014 may be connected to the computer 1000 through a storage controller 1016 connected to the chipset 1006. The mass storage device 1014 may consist of one or more physical storage units. The storage controller 1016 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 may store data on the mass storage device 1014 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 1014 is characterized as primary or secondary storage, and the like.

For example, the computer 1000 may store information to the mass storage device 1014 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 may further read information from the mass storage device 1014 by detecting the physical states or characteristics of one or more particular locations within the physical storage units.

In addition to the mass storage device 1014 described above, the computer 1000 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 1000.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 1014 may store an operating system, such as the FPGA instance operating system 508, utilized to control the operation of the computer 1000. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 1014 may store other system or application programs and data utilized by the computer 1000, such as the instance launch manager 114, the FPGA design application 500, the FPGA compiler application 502, the FPGA simulation application 504, the FPGA programming application 506, and/or any the other software components and data described above. The mass storage device 1014 might also store other programs and data not specifically identified herein.

In one embodiment, the mass storage device 1014 or other computer-readable storage media is encoded with computer-executable instructions which, when loaded into the computer 1000, transforms the computer from a general-purpose computing system into a special-purpose computer capable of implementing the embodiments described herein. These computer-executable instructions transform the computer 1000 by specifying how the CPUs 1004 transition between states, as described above. According to one embodiment, the computer 1000 has access to computer-readable storage media storing computer-executable instructions which, when executed by the computer 1000, perform the various methods described above with regard to FIGS. 6-9.

The computer 1000 may also include one or more input/output controllers 1018 for receiving and processing input from a number of input devices, such as a keyboard, a mouse, a touchpad, a touch screen, an electronic stylus, or other type of input device. Similarly, the input/output controller 1018 may provide output to a display, such as a computer monitor, a flat-panel display, a digital projector, a printer, a plotter, or other type of output device. It will be appreciated that the computer 1000 may not include all of the components shown in FIG. 10, may include other components that are not explicitly shown in FIG. 10, or may utilize an architecture completely different than that shown in FIG. 10.

Based on the foregoing, it should be appreciated that technologies for providing field-programmable devices in a distributed execution environment have been presented herein. Although the disclosure presented herein has been primarily made with reference to the selection and deployment of virtual machine instances, it should be appreciated that the embodiments disclosed herein might also be utilized to provide access to field-programmable devices utilizing other types of computing resources. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing field-programmable gate arrays ("FPGAs") in a distributed execution environment, the computer-implemented method comprising:
    receiving; from a customer computing system, a request to launch a virtual machine instance, the virtual machine instance providing access to field-programmable device resources within the distributed execution environment, the request to launch the virtual machine instance specifying a first configuration for the field-programmable device resources, the first configuration including a first type of field-programmable device resources and a first number of field-programmable device resources;
    in response to receiving the request to launch the virtual machine instance, launching the virtual machine instance;
    receiving, by the virtual machine instance, an FPGA design for use in programming the field-programmable device resources;
    programming the field-programmable device resources based at least part on the FPGA design and the first configuration to produce a first programmed FPGA;
    causing the first programmed FPGA to run within the distributed execution environment;
    returning results of running the first programmed FPGA to the customer computing system;
    based at least in part on the results, performing an auto-scaling function to modify the first configuration used to program the first programmed FPGA to produce a second configuration, the second configuration including a second type of field-programmable device resources and a second number of field-programmable device resources, wherein the second type of field-programmable device resources differs from the first type of field-programmable device resources or the second number of field-programmable device resources differs from the first number of field-programmable device resources;
    reprogramming the field-programmable device resources based at least in part on the FPGA design and the second configuration to produce a second programmed FPGA; and
    causing the second programmed FPGA to run within the distributed execution environment.

2. The computer-implemented method of claim 1, wherein the first programmed FPGA or the second programmed FPGA comprises a physical FPGA.

3. The computer-implemented method of claim 1, wherein the first programmed FPGA or the second programmed FPGA comprises a virtual FPGA.

4. The computer-implemented method of claim 3, wherein the virtual FPGA comprises a portion of a physical FPGA that is configured to provide a plurality of virtual FPGAs.

5. The computer-implemented method of claim 3, wherein the virtual FPGA comprises a plurality of physical FPGAs.

6. The computer-implemented method of claim 1, wherein the first programmed FPGA or the second programmed FPGA is one of a plurality of FPGAs to which the virtual machine instance provides access.

7. The computer-implemented method of claim 1, wherein receiving the FPGA design for use in programming the field-programmable device resources comprises receiving the FPGA design via an FPGA compiler application executing on the virtual machine instance.

8. The computer-implemented method of claim 1, wherein receiving the FPGA design for use in programming the field-programmable device resources comprises receiving the FPGA design from an FPGA design image storage component associated with the virtual machine instance.

9. The computer-implemented method of claim 1, wherein receiving the FPGA design for use in programming the field-programmable device resources comprises receiving the FPGA design from the customer computing system.

10. The computer-implemented method of claim 1, further comprising receiving a request to send the FPGA design to a fabrication plant.

11. A computer-implemented method comprising performing computer-implemented operations for:
    launching an instance within a distributed execution environment, the instance being configured to provide access to one or more field-programmable device resources using a first configuration including a first type of field-programmable device resources and a first number of field-programmable device resources;
    receiving a field-programmable device resource design configured to program the one or more field-programmable device resources;
    programming the one or more field-programmable device resources using the field-programmable device resource design and the first configuration to produce a first programmed device resource;
    causing the first programmed device resource to run in the distributed execution environment;
    returning output from the first programmed device resource to a customer computing system;
    based at least in part on the output, performing an auto-scaling function to automatically scale up or down either the first type of field-programmable device resources or the first number of field-programmable device resources to create a second configuration, the second configuration including a second type of field-programmable device resources and a second number of field-programmable device resources, wherein the second type of field-programmable device resources differs from the first type of field-programmable device resources or the second number of field-programmable device resources differs from the first number of field-programmable device resources;

reprogramming the one or more field-programmable device resources using the field-programmable device resource design and the second configuration to produce a second programmed device resource; and causing the second programmed device resource to run.

12. The computer-implemented method of claim 11, wherein the first programmed device resource or the second programmed device resource comprises one or more physical field-programmable devices.

13. The computer-implemented method of claim 11, wherein the first programmed device resource or the second programmed device resource comprises one or more virtual field-programmable devices operating on one or more physical field-programmable devices.

14. The computer-implemented method of claim 11, further comprising receiving, from the customer computing system, a request to launch the instance, and wherein the request comprises the field-programmable device resource design.

15. The computer-implemented method of claim 14, wherein the instance is further configured to provide access to computing resources, and wherein the request further comprises a configuration for the computing resources.

16. The computer-implemented method of claim 15, wherein receiving the field-programmable device resource design comprises receiving the field-programmable device design via an application executing on the computing resources of the instance.

17. The computer-implemented method of claim 11, wherein the auto-scaling function is initiated based at least in part on one or more pre-defined conditions.

18. The computer-implemented method of claim 17, wherein the one or more pre-defined conditions comprises a condition that the first programmed device resource fails to run.

19. The computer-implemented method of claim 11, wherein the first programmed device resource or the second programmed device resource comprises one of a field-programmable gate array resource, a field-programmable object array resource, a memristor array resource, or a programmable neural network device.

20. A system comprising:

a field-programmable device resource operating within a distributed execution environment; and a computer system comprising a processor and memory and operating within the distributed execution environment, the computer system being configured to;

receive a request to instantiate a new instance to utilize one or more field-programmable device resources, the request specifying a first configuration for the one or more field-programmable device resources including a first type of field-programmable device resources and a first number of field-programmable device resources;

instantiate the new instance to utilize the one or more field-programmable device resources;

receive a field-programmable device resource design;

program the one or more field-programmable device resources using the field-programmable device resource design and the first configuration to produce a first programmed device resource;

cause the first programmed device resource to run within the distributed execution environment;

return results of running the first programmed device resource to a customer computing system;

based at least in part on the results, performing an auto-scaling function to automatically scale up or down either the first type of field-programmable resource or the first number of field-programmable resources used to run the first programmed device resource to create a second configuration, the second configuration including a second type of field-programmable device resources and a second number of field-programmable device resources, wherein the second type of field-programmable device resources differs from the first type of field-programmable device resources or the second number of field-programmable device resources differs from the first number of field-programmable device resources;

reprogramming the one or more field-programmable device resources using the field-programmable device resource design and the second configuration to produce a second programmed device resource; and causing the second programmed device resource to run.

21. The system of claim 20, wherein the computer system operates within a data center associated with the distributed execution environment.

22. The system of claim 21, wherein the request to instantiate the new instance is received from the customer computing system that is in communication with the distributed execution environment via a network.

23. The system of claim 22, wherein the new instance to utilize the one or more field-programmable device resources is instantiated for a cost to a customer associated with the customer computing system.

* * * * *